(12) United States Patent
Liao

(10) Patent No.: US 7,488,027 B2
(45) Date of Patent: Feb. 10, 2009

(54) VEHICLE TRUNK LID

(75) Inventor: Ming-Te Liao, Taipei (TW)

(73) Assignee: Yi-Ting Enterprise Ltd., Taipei (TW)

( * ) Notice: Subject to any disclaimer, the term of this patent is extended or adjusted under 35 U.S.C. 154(b) by 234 days.

(21) Appl. No.: 11/635,572

(22) Filed: Dec. 8, 2006

(65) Prior Publication Data

US 2008/0093877 A1 Apr. 24, 2008

(30) Foreign Application Priority Data

Oct. 18, 2006 (TW) .............................. 95218418 U

(51) Int. Cl.
*B62D 25/10* (2006.01)
(52) U.S. Cl. .................... 296/76; 296/100.06
(58) Field of Classification Search .................. 296/76, 296/187.11, 26.02, 100.06, 203.04, 37.1, 296/37.7
See application file for complete search history.

(56) References Cited

U.S. PATENT DOCUMENTS

| 4,083,596 | A | * | 4/1978 | Robertson | ................. | 296/100.1 |
| 4,253,595 | A | * | 3/1981 | Tiffany | ....................... | 280/769 |
| 4,274,569 | A | * | 6/1981 | Winter et al. | ................ | 224/319 |
| 5,094,499 | A | * | 3/1992 | Simone, Jr. | ............... | 296/100.1 |
| 5,632,522 | A | * | 5/1997 | Gaitan et al. | ........... | 296/100.06 |
| 5,868,453 | A | * | 2/1999 | Steigner | ................... | 296/100.1 |
| 5,909,921 | A | * | 6/1999 | Nesbeth | ................. | 296/100.06 |
| 6,497,445 | B1 | * | 12/2002 | Combs, II | .............. | 296/100.06 |
| 6,588,826 | B1 | * | 7/2003 | Muirhead | .............. | 296/100.06 |
| 6,641,201 | B1 | * | 11/2003 | Pietryga et al. | ........ | 296/100.06 |
| 7,040,675 | B1 | * | 5/2006 | Ott et al. | ...................... | 292/216 |
| 7,422,265 | B1 | * | 9/2008 | Liao | ........................ | 296/100.1 |

* cited by examiner

*Primary Examiner*—Kiran B. Patel
(74) *Attorney, Agent, or Firm*—Troxell Law Office PLLC

(57) ABSTRACT

A vehicle trunk lid is provided with a lid which can cover on the vehicle trunk. Hinges are provided below the trunk lid for connecting to the side boards of the trunk, while respective hydraulic bars are provided below the two sides of the trunk, including side bars and several horizontal bars, such that the trunk may have a private space for storage purposes, and can be locked up. The support frame can bear and hold large freight.

6 Claims, 10 Drawing Sheets

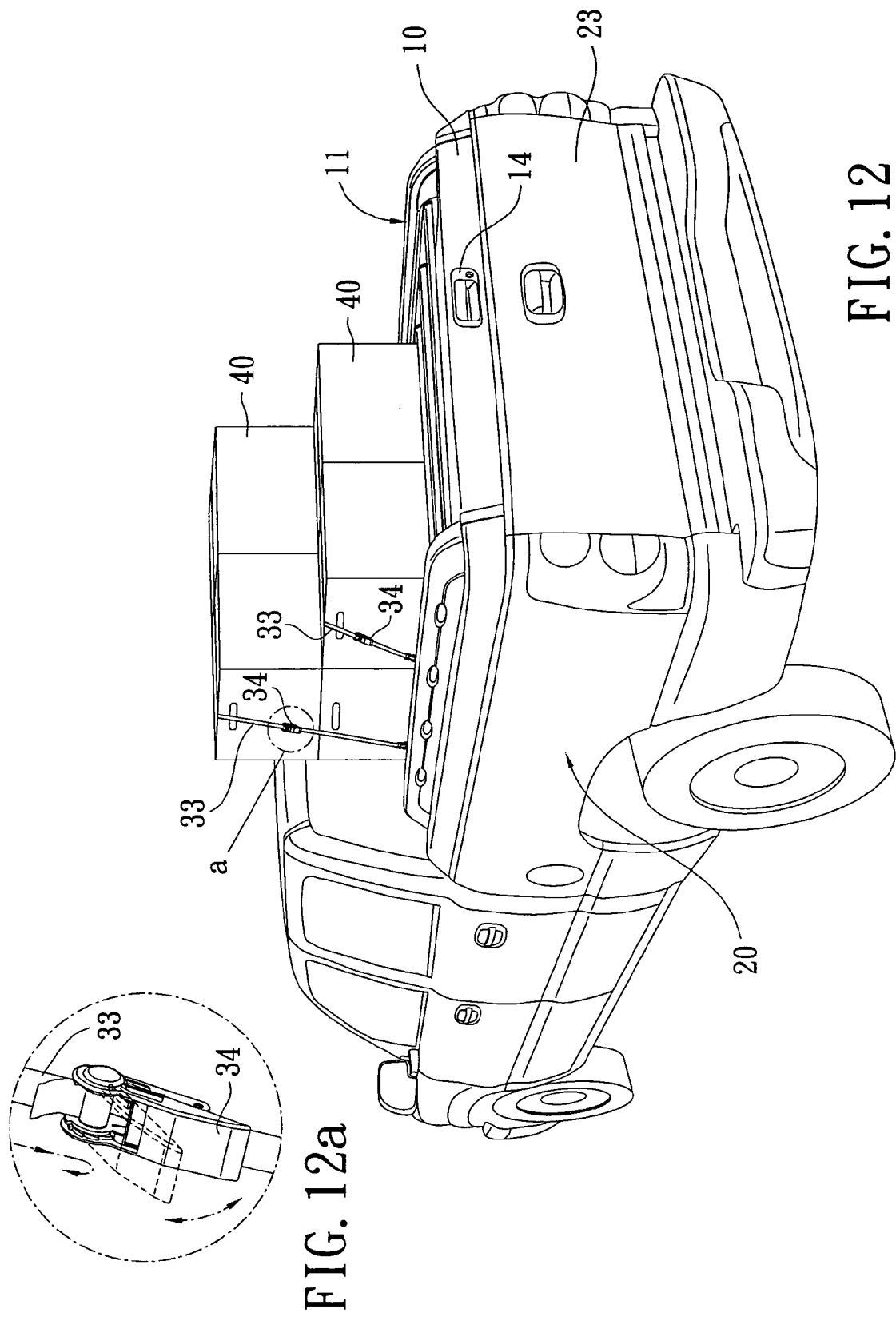

VEHICLE TRUNK LID

BACKGROUND OF THE INVENTION (a) Field of the Invention

The present invention relates to a vehicle trunk lid, and particularly to one that can be installed on the trunk of a pickup truck, so as to prevent the freight in the trunk from being exposed to the rain, and to increase the utility of the trunk.

(b) Description of the Prior Art

Vehicle is an extremely convenient traffic instrument. Take a pickup truck for example, it not only can carry five persons, but also can carry freight in the trunk. However, as the general pickup trucks have an open trunk, the user must prepare a tent for contingent use. In comparison with the trunk of an automobile, the pickup truck is rather inconvenient in use. Besides, when carrying freight in the rain, the freight would easily get wet, let along the exposed freight is easily stolen, and the arrangement of the freight might be disorder in sight. There exists a need in improvement.

In view of the above, the inventor has researched and developed the improvements for the prior art, as disclosed herein.

SUMMARY OF THE INVENTION

The primary object of the invention is to provide a vehicle trunk lid, which can prevent the freight disposed in the trunk from being stolen or missing, or from getting wet in the rain, thereby increasing the utility of the vehicle (pickup trunk), as well as the aesthetics of the vehicle.

The secondary object of the invention is to provide a vehicle trunk lid, which can cover the open trunk and be provided with a lock for anti-theft purposes.

To obtain the above objects, the invention is provided with a vehicle trunk lid which can cover the vehicle trunk. A support frame provided on the lid has two hinges respectively provided below the two sides of the front end for connecting with the trunk, and two hydraulic bars respectively provided below the two sides of the middle section. The lower ends of the hydraulic bars are connected to the side boards of the trunk for the purposes of supporting and buffing. The rear center of the lid is provided with a handle with a lock which, through two pull rods, connected to the hook bases at the left and right side. Corresponding lock bases are installed at the side boards of the trunk for locking to the locks at the time when the lid is closed with the trunk, thereby preventing the freight disposed in the trunk from being stolen or exposed in the rain, and thereby increasing the utility, as well as the style, of the vehicle (pickup truck).

To completely appreciate these and other objects of the present invention as well as the invention itself, all of which will become apparent to those skilled in the art, the following detailed description of the invention and the claims should be read in conjunction with the accompanying drawings.

BRIEF DESCRIPTION OF THE DRAWINGS

FIG. 12 shows the application of the invention to the trunk.

FIG. 12a is a partially enlarged view taken from FIG. 12.

DETAILED DESCRIPTION OF THE PREFERRED EMBODIMENTS

Figure 1:
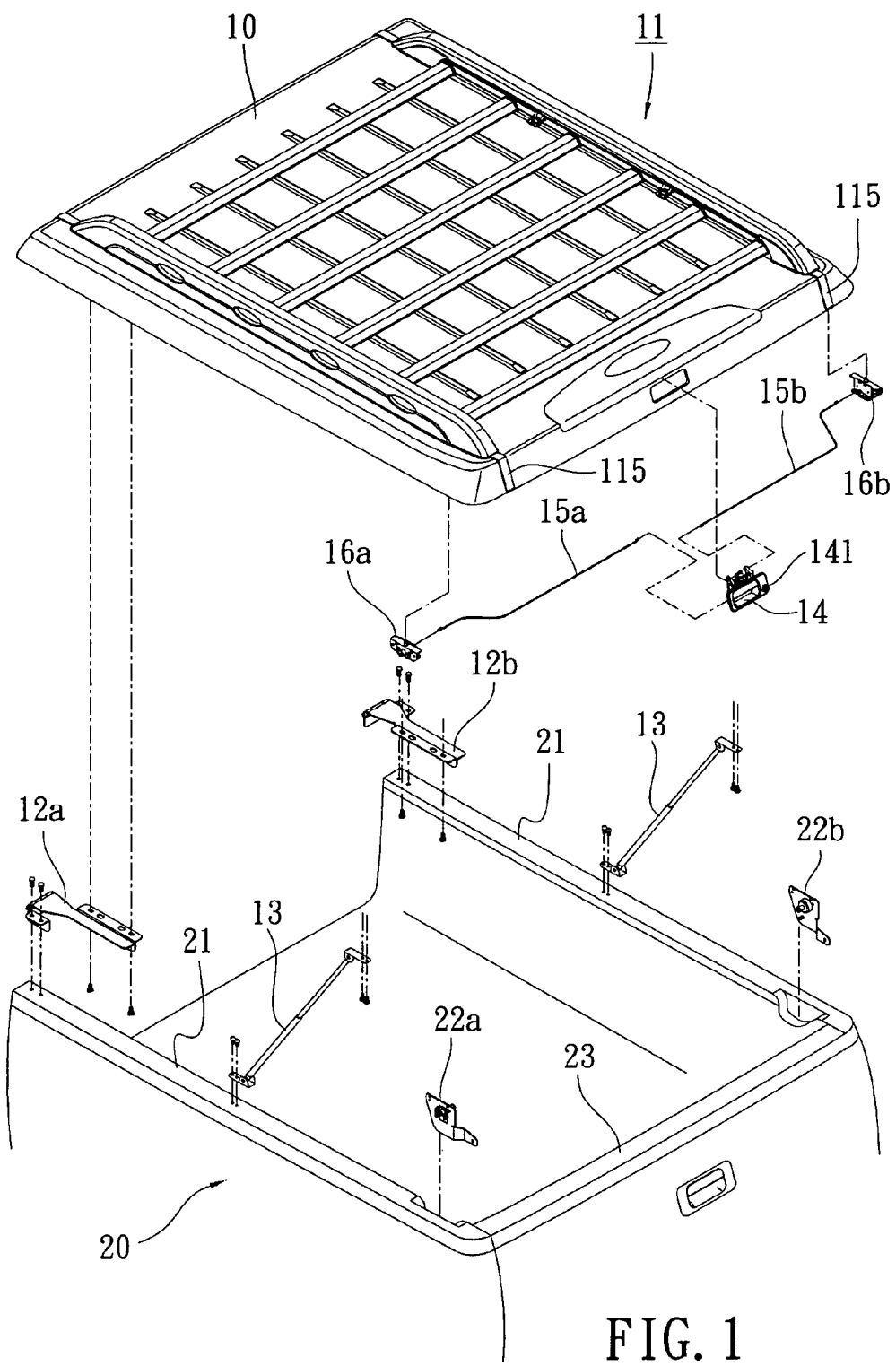
FIG. 1 is an exploded view of the present invention.
Figure 2:
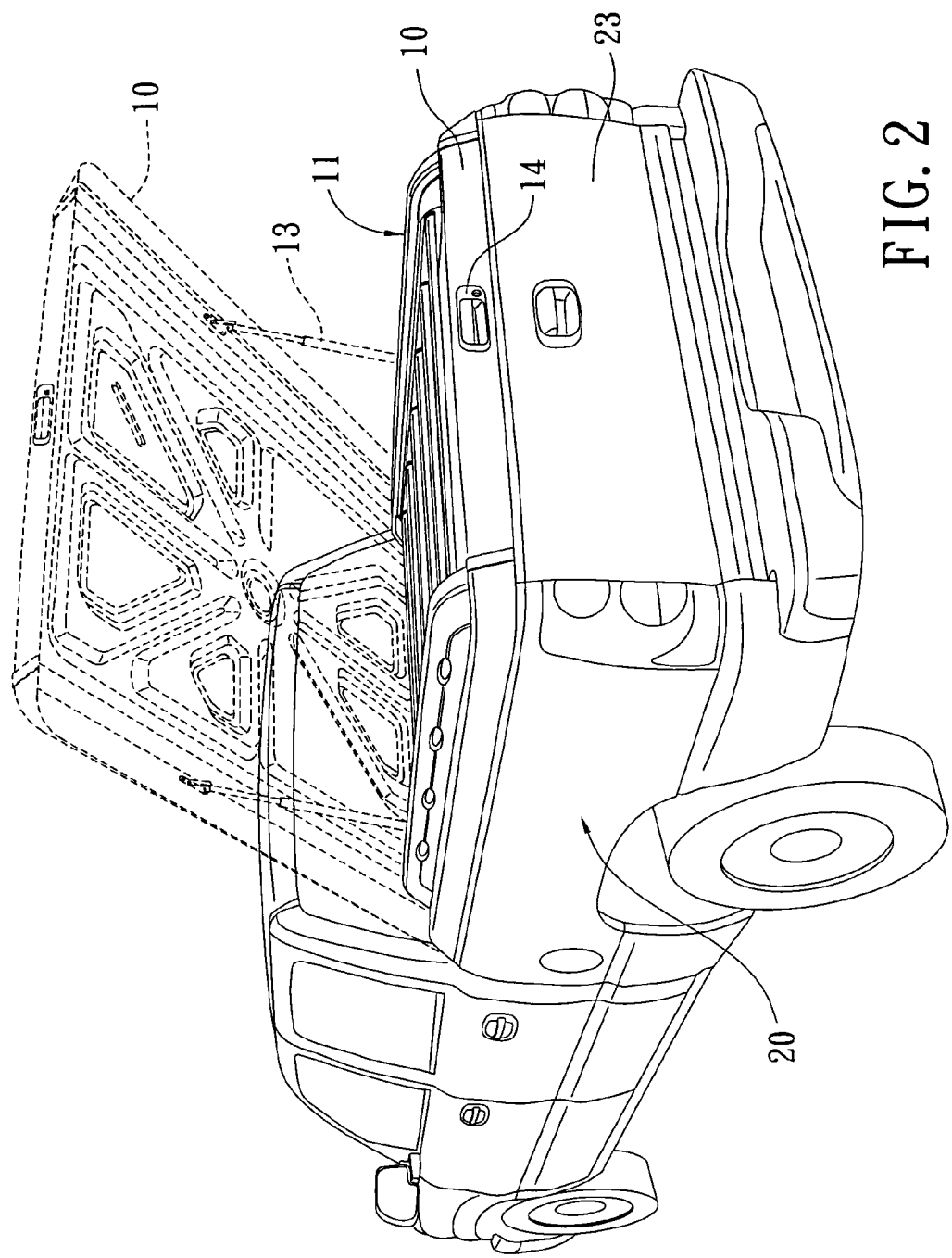
FIG. 2 is a perspective view showing assembly of the invention to a vehicle trunk.

Please refer to FIGS. 1 and 2, the vehicle trunk lid of the invention is provided with a lid 10 which can be mounted on the trunk 20. The lid 10 is provided with a support frame 11 above, and respective hinges 12a, 12b at the two side of the bottom front end; each of the hinges 12a, 12b is connected to the side boards 21 of the trunk 20. Besides, two hydraulic bars 13 respectively provided below the two sides of the middle section of the lid 10; the lower ends of the hydraulic bars 13 are connected to the side boards 21 of the trunk 20. The rear center of the lid 10 is provided with a handle with a door lock 141 which, through the left pull rod 15a at the left side of the handle 14, connected to the left hook base 16a which is installed at the left bottom side of the lid 10, as well as through the right pull rod 15b at the right side of the handle 14, connected to the right hook base 16b which is installed to the right bottom side of the lid 10. The two side boards 21 of the trunk 20 are installed with left lock 22a and right lock 22b corresponding to left lock base 16a and right lock base 16b, such that when the lid 16 is closed, the left lock base 16a and the right lock base 16b can be fastened to the left lock 22a and right lock 22b, respectively, thereby locking the trunk lid 10, so that the user can feel safe to put articles in the trunk 20, and that the article will not get wet in the rain, or get lost or stolen.

Figure 3:
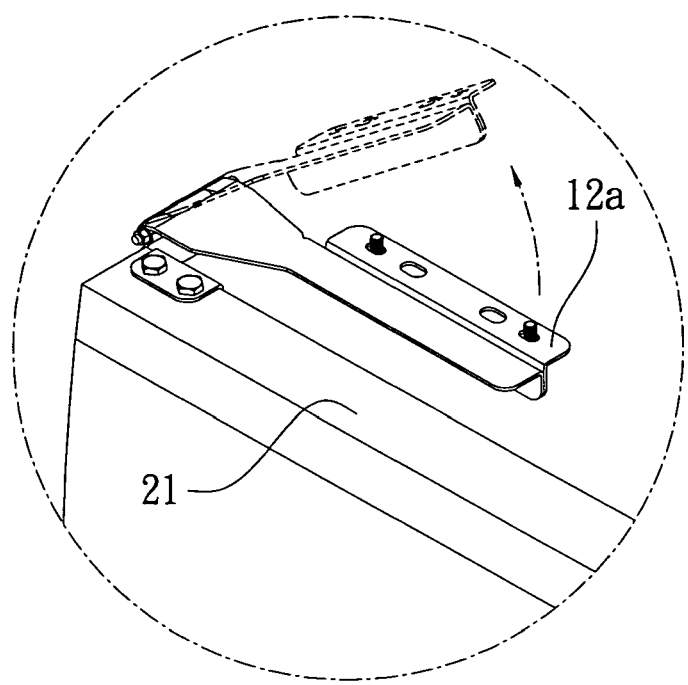
FIG. 3 is a partially enlarged view of the invention.

As shown in FIGS. 2, 3, 4 and 5, when the trunk lid 10 is in use, it can be opened via the connection of the hinges 12a, 12b to the side boards 21 of the trunk 20 (see FIG. 3). When opening the lid 10, the user need not make a great effort since the stretch of the hydraulic bars 13 at the front sides can make a release, as well as can support the lid 10 after it is opened. On the other hand, when closing the lid 10, the lid 10 can obtain a buffer effect through the compression of the hydraulic bars 13. Accordingly, the locking flags 161 inside the left and right lock bases 16a, 16b can firmly lock to the interior of the side boards 21 of the trunk 20, and further fastened via the left and right locks 22a, 22b.

Figure 4:
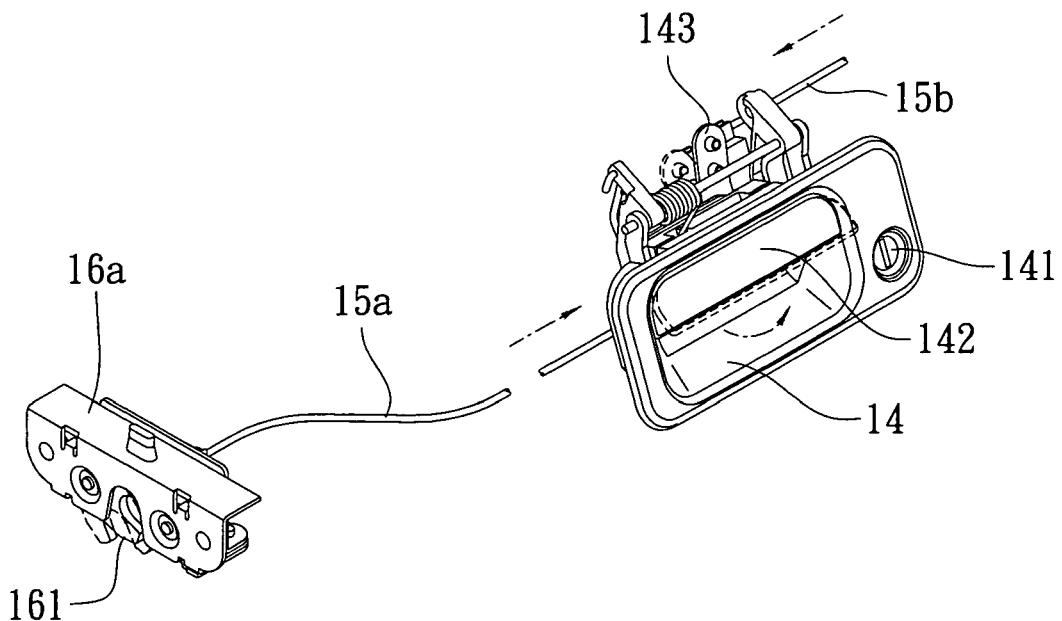
FIG. 4 shows the operation of the handle of the invention.

As shown in FIG. 4, when the user intends to open the lid 10, he/she only needs to pull the handle 142 on the door handle 14, which will rotate the flap 143 at the rear, and concomitantly trigger the left and right pull rods 15a, 15b connected at the flap 143 to move centrally, rendering the left and right lock bases 16a, 16b flip away and unlock to open the lid 10.

Figure 5:
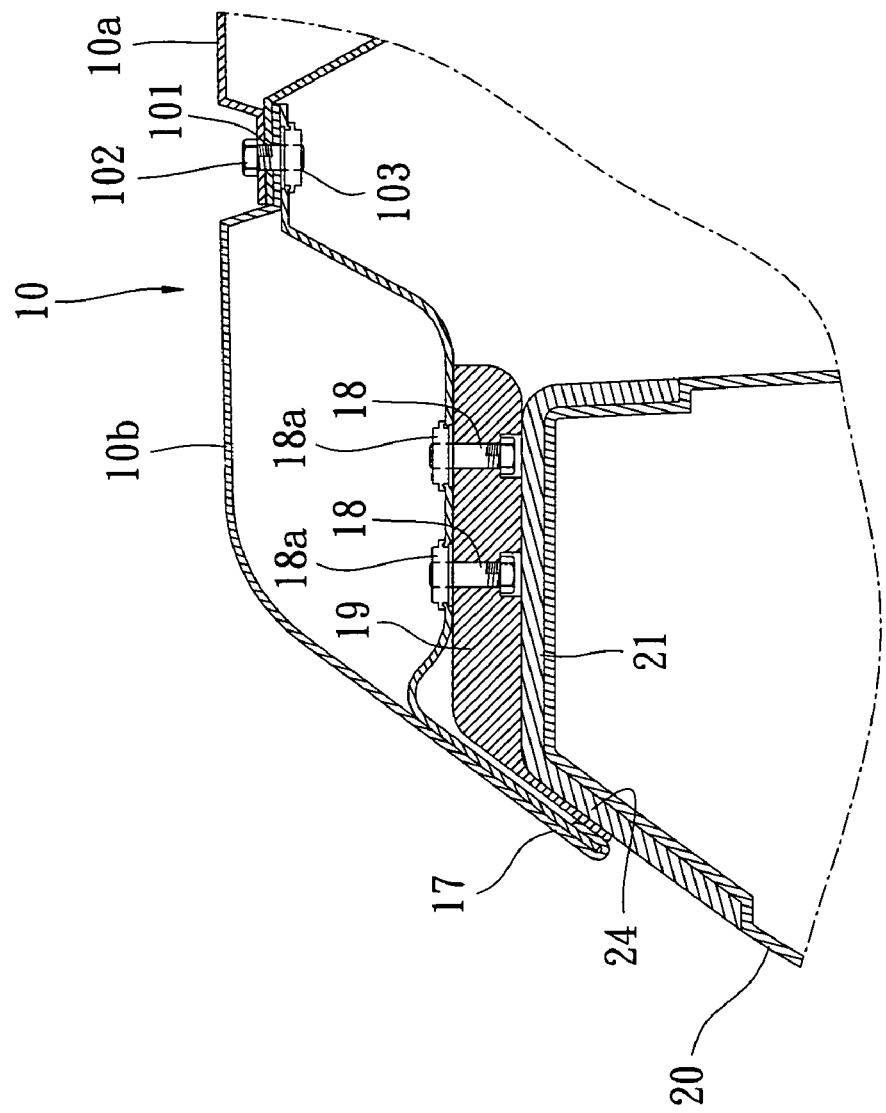
FIG. 5 is a partially enlarged view showing close of the invention.

Referring to FIG. 5, as the extending edge 17 of the lid 10 is relatively long in order to cover outside of the side edge 24 of the trunk at the time of closing, when the lid 10 is closed, the trunk door 23 cannot be opened. Such design is especially suitable to those trunk doors without locks. Meanwhile, when the bottom of the extending edge 17 of the lid 10 is fastened to the screw caps at the bottom of the lid 10 via screws 18, the lining 19 can be fastened, such that the lid 10 and the side boards 21 of the trunk 20 will be closer to each other. Furthermore, in view of the buffing of the lining 19, the vehicle would not make noise due to the shock in process. When the lid 10 is closed with the trunk door 23, the lock 131 of the rear door handle 13 will be firmly fastened to obtain an anti-theft effect.

Figure 6:
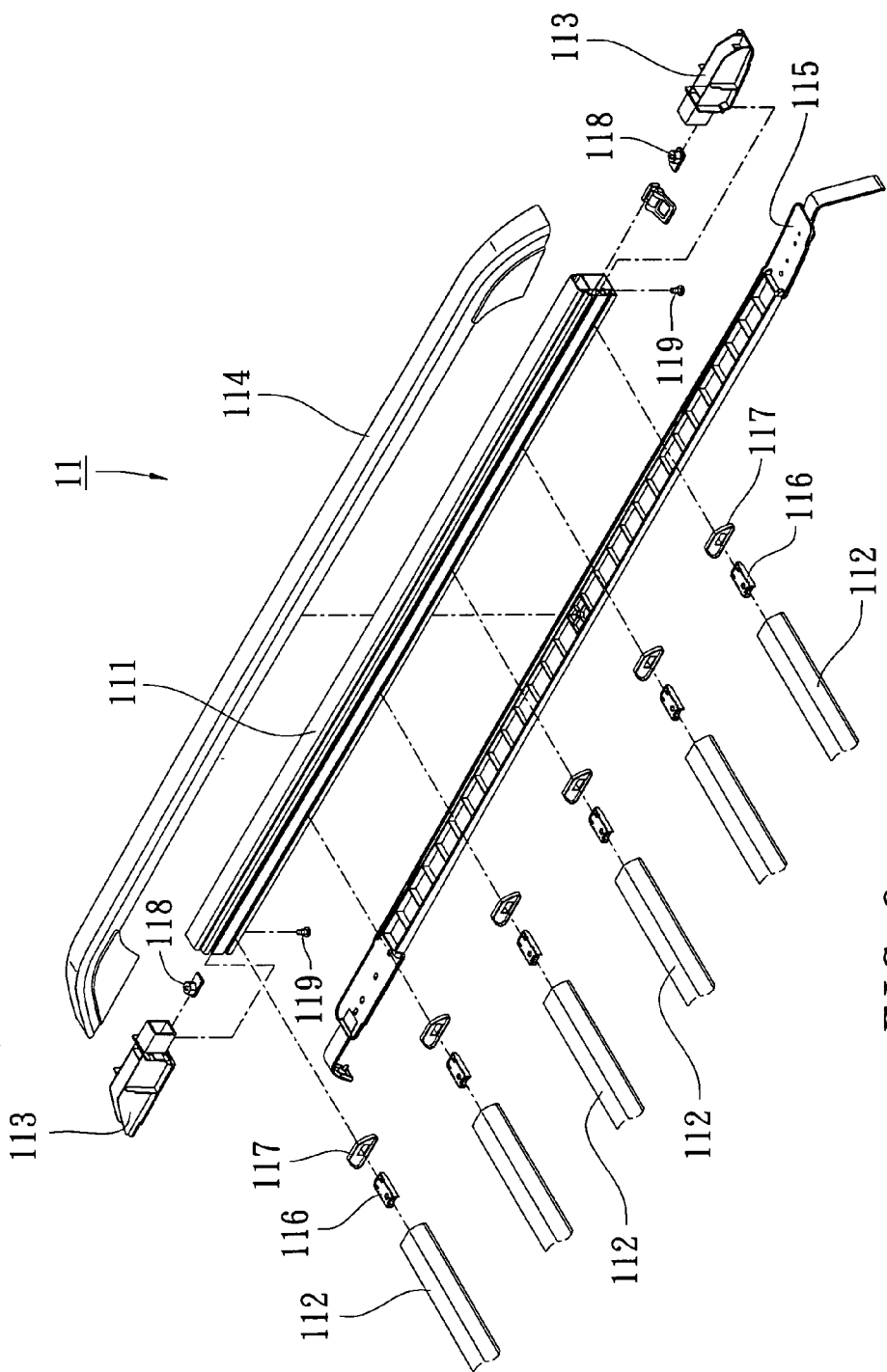
FIG. 6 is an exploded view of the support frame of the invention.

As shown in FIG. 6, a support frame 11 is provided on the top of the lid 10. Each of the two sides of the support frame 11 is provided with a side bar 111; several horizontal bars 112 are provided between the two side bars 111 for bearing larger freight, luggage or bicycles. The respective end pieces 113 are mounted onto the two ends of the side bars 111, the coupling portions of the side bars 111 and the end pieces 113 are provided with screw caps 118 for receiving screws 119 which go through side bars 111 and the end pieces 113 for fastening purposes. At last, the side bars 111 are mounted with top covers 114, provided with a base board 115 at the underside for installed to the top sides of the lid 10 (see FIG. 1), and engaged at the end edge with end caps 117 and connectors 116 which combine the horizontal bars 112 with the side bars 111.

Referring to FIGS. 7~10, in assembly of the horizontal bars 112 of the support frame 11, the connectors 116 are engaged in the interior groove of the horizontal bars 112, such that the ends of the connectors 116 will protrude out of the horizontal bars 112. The ends of the horizontal bars 112 are mounted with end caps 117, the center of which has a through hole such that the ends of the connectors 116 can protrude to insert into the locking groove a of the side bars 111. The screws on the bottom of the connectors 116 are screwed to make the clamps b at the protruded front end of the connectors 116 to wide open for combining to the locking groove a of the side bars 111 for fastening purposes (see FIG. 10). Such design effectuates firm and instant assembly.

Figure 8:
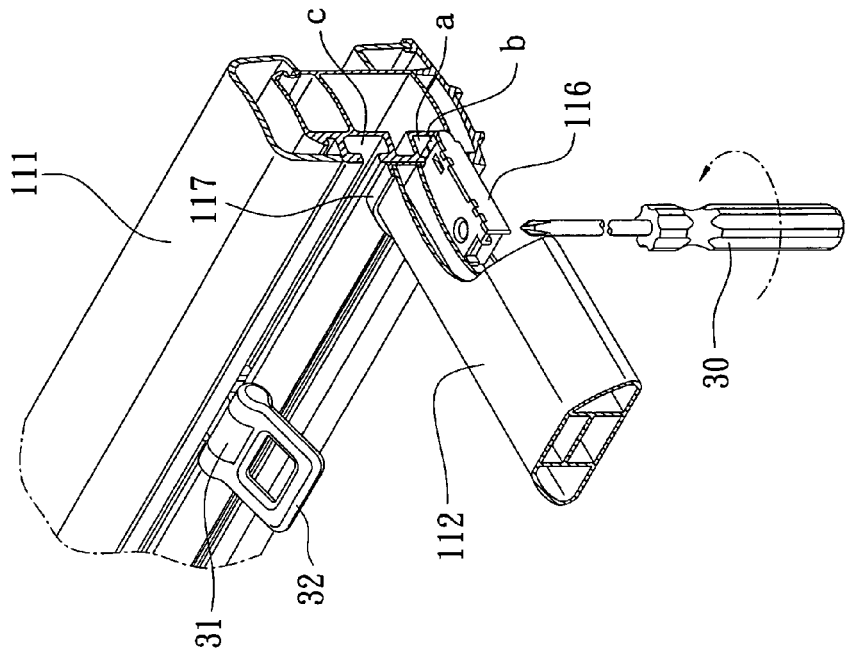
FIG. 8 shows the horizontal bars of the support frame after assembly.
Figure 7:
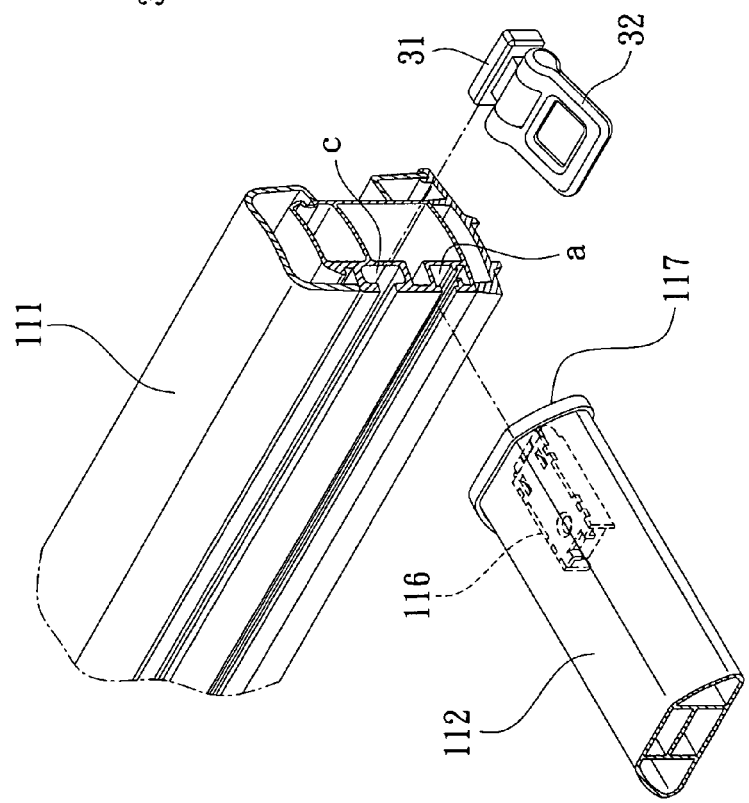
FIG. 7 shows the horizontal bars of the support frame before assembly.
Figure 9:
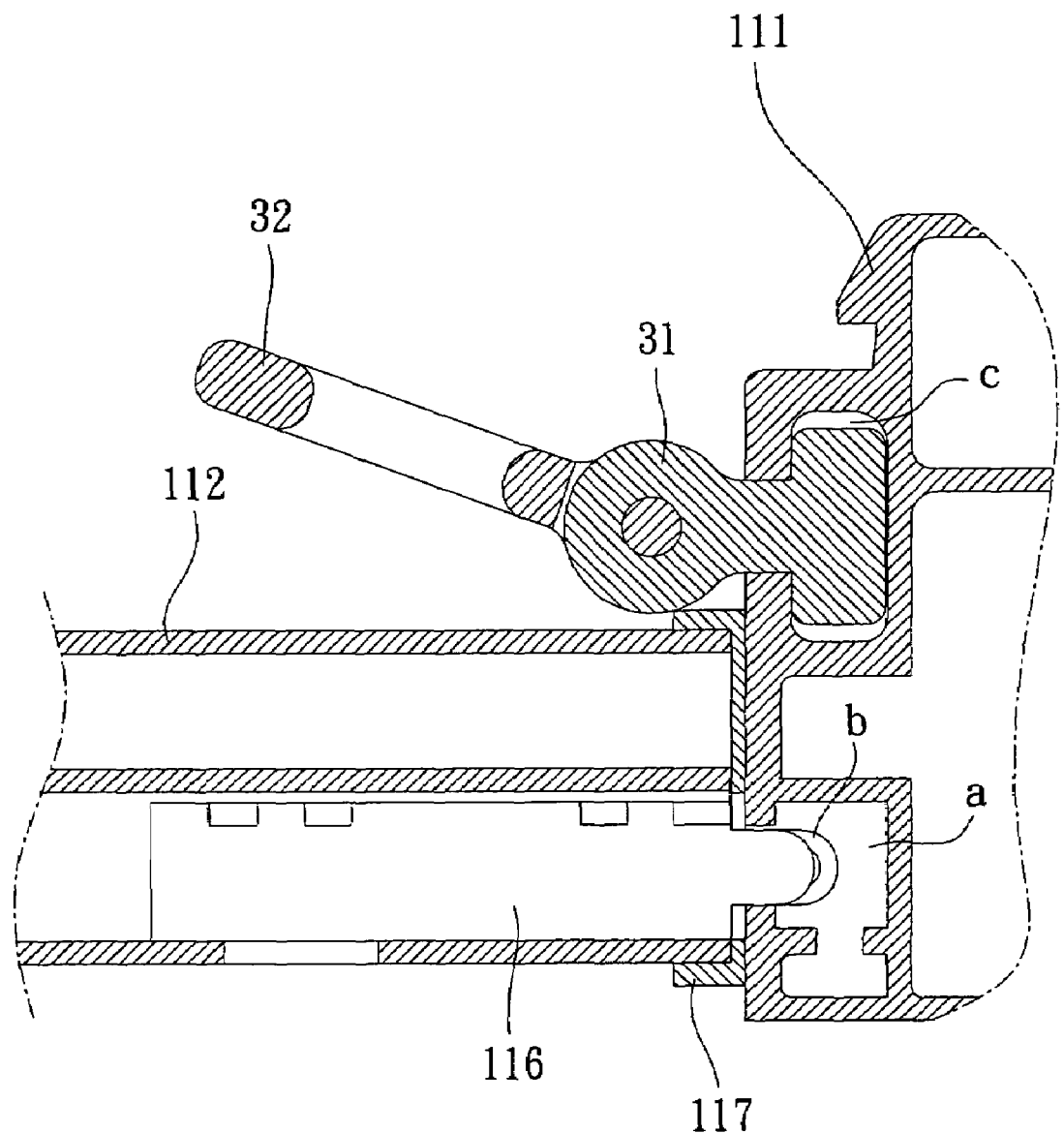
FIG. 9 is a cut-away view of the horizontal bars of the support frame before assembly.
Figure 10:
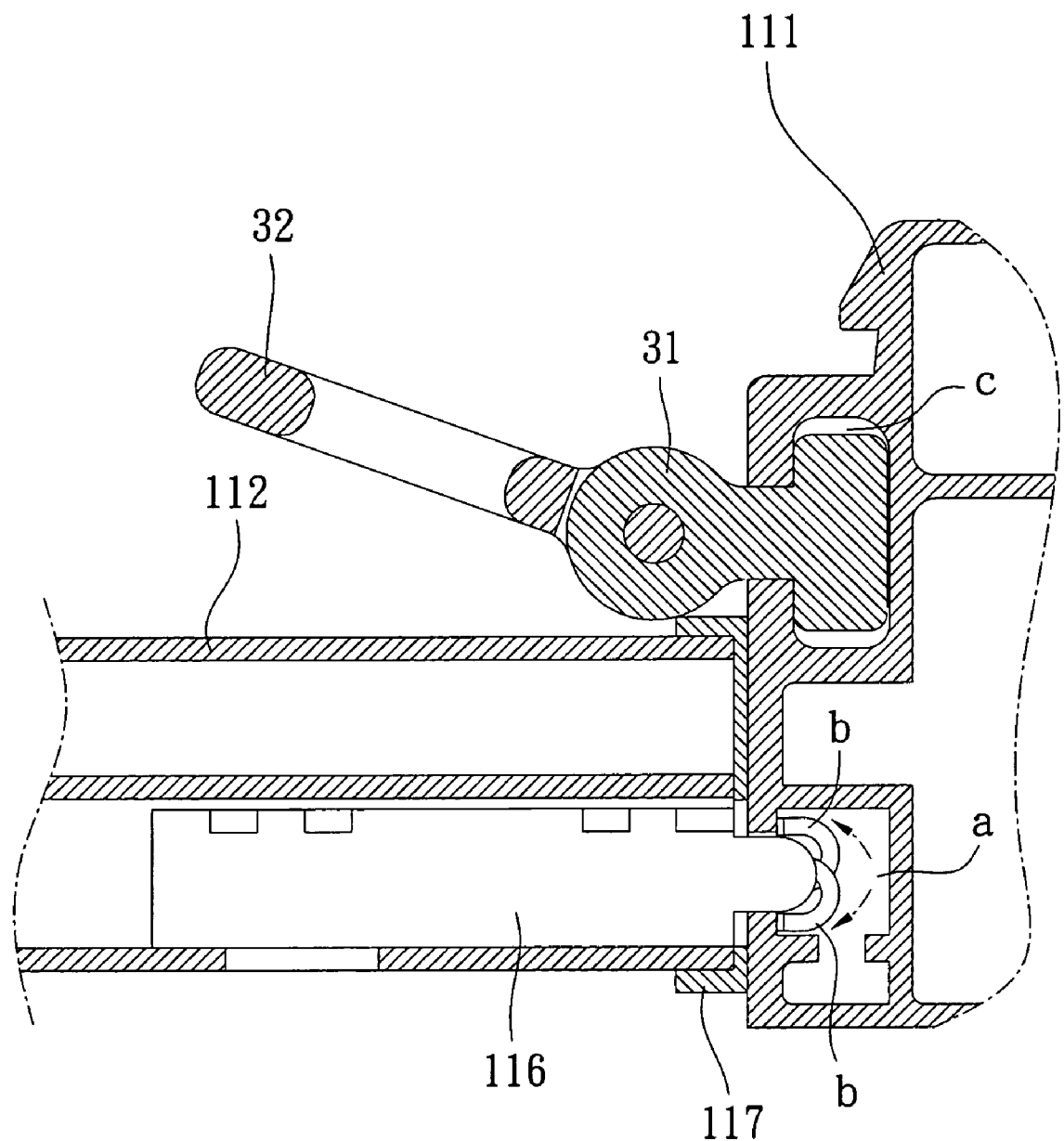
FIG. 10 is a cut-away view of the horizontal bars of the support frame after assembly.

As shown in FIGS. 7~9, a slide groove c is further provided on the side bar 111, such that a slide base 31 can slide into the slide groove c from the side of the side bars 111. A locking ring 32 is pivotally provided at the front end of the slide base 31 for holding the article binding string. The sliding bases 31 can freely move on the slide grooves c.

As shown in FIGS. 12 and 12a, the locking rings 32 at the left and right sides of the lid 10 can held the locking pieces at the two sides of the string 22, such that when a larger article 40 is disposed on the horizontal bars 112 of the support frame 11, the article 40 would not fell out of the vehicle during processing. The locking pieces at the string 33 go around the large article 40, and the string 22 is fastened by a ratchet fastener 34 to easily bind articles on the support frame 11.

Figure 11:
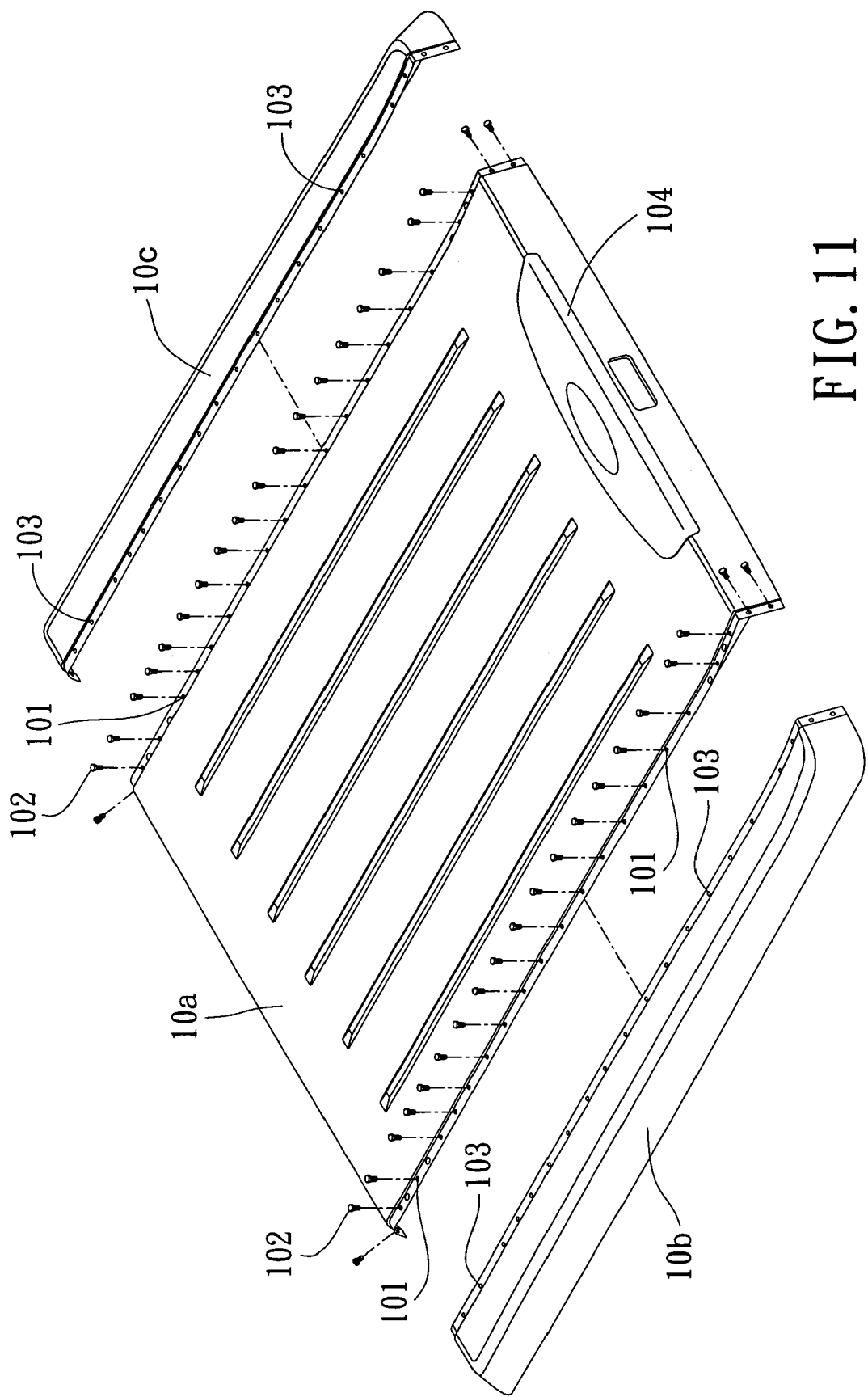
FIG. 11 is an exploded view of the trunk lid of the invention.

As shown in FIG. 11, the lid 10 can be a single board formed integrally, or in an assembly form. As shown, the lid 10 is composed of three pieces, including a central piece 10a, a left side 10b and a right side 10c. The two sides of the central piece 10a are provided with hollow frames which have several screw holes 101. The left and right sides 10b, 10c are also provided with hollow frames with several screw holes 103, such that the left and right sides 10b, 10c can be assembled to the left and right of the central piece 10a, respectively, and fastened to the central piece 10a via screws 102 going through the screw holes 101, 103 to form an integral trunk lid 10. The connecting rim of the left and right sides 10b, 10c and the central piece 10a can be covered by the base board 115 of the support frame 11 (see FIG. 1), to make the outer appearance aesthetic. The rear upper of the lid 10 may be provided with a plastic spacer 104 to prevent the support frame 11 from being scratched during the transportation of freight.

It is of course to be understood that the embodiments described herein are merely illustrative of the principles of the invention and that a wide variety of modifications thereto may be effected by persons skilled in the art without departing from the spirit and scope of the invention as set forth in the following claims.

What is claimed is:

1. A vehicle trunk lid, comprising a lid and a support frame, wherein, the lid, being mount on the vehicle trunk, is provided with a support frame above, two hinges respectively provided below two sides of a front end for connecting with the trunk, and two hydraulic bars respectively provided below two sides of the middle section of the lid; the lower ends of the hydraulic bars are connected to the side boards of the trunk, and, through a left pull rod and a right pull rod, connected to the left and right hook bases inside of the side boards of the trunk;

the support frame is provided at the upper of the trunk lid, and provided with two side bars respectively at the two sides of the trunk lid; several horizontal bars are provided between the two side bars; while respective end pieces are mounted onto the two ends of the side bars, the coupling portions of the side bars and the end pieces are provided with screw caps for receiving screws which go through side bars and end pieces for fastening purposes; the side bars are mounted with top covers, provided with a base board at the underside, and engaged at the end edge with end caps and connectors which combine the horizontal bars with the side bars.

2. The vehicle trunk lid according to claim 1, wherein the trunk lid is in an assembly form, and includes a central piece, a left side and a right side; the two sides of the central piece are provided with hollow frames which have several screw holes, while the left and right sides are also provided with hollow frames with several screw holes, such that the left and right sides can be assembled to the left and right of the central piece, respectively, and fastened to the central piece via screws to form an integral trunk lid.

3. The vehicle trunk lid according to claim 1, wherein the extending edge of the trunk lid is longer than the trunk for mounting at the outer edge of the trunk.

4. The vehicle trunk lid according to claim 1, wherein the underside of the extending edge of the trunk lid is fastened with a lining.

5. The vehicle trunk lid according to claim 1, wherein the horizontal bars of the support frame are interiorly provided with connectors, the ends of which protrude out of the horizontal bars; the ends of the horizontal bars are mounted with end caps, the center of which has a through hole such that the ends of the connectors can protrude to insert into the locking groove of the side bars; the screws on the bottom of the connectors are screwed to make the clamps at the protruded front end of the connectors to wide open for combining to the side bars.

6. The vehicle trunk lid according to claim 5, wherein a slide groove is further provided on the locking groove of the side bar, such that a slide base can slide into the slide groove from the side of the side bars; a locking ring is pivotally provided at the front end of the slide base for holding the article binding string; the sliding bases can freely move on the slide grooves.

* * * * *